(12) United States Patent
Elias et al.

(10) Patent No.: US 7,113,956 B1
(45) Date of Patent: Sep. 26, 2006

(54) KNOWLEDGE MANAGEMENT SYSTEM AND METHOD

(75) Inventors: Romeo E Elias, Encino, CA (US); Jaime D Sipila, Los Angeles, CA (US); Andrew Young, Santa Monica, CA (US)

(73) Assignee: Interneer Inc., Culver City, CA (US)

( * ) Notice: Subject to any disclaimer, the term of this patent is extended or adjusted under 35 U.S.C. 154(b) by 505 days.

(21) Appl. No.: 10/002,295

(22) Filed: Nov. 20, 2001

Related U.S. Application Data

(60) Provisional application No. 60/252,207, filed on Nov. 20, 2000, provisional application No. 60/252,261, filed on Nov. 20, 2000.

(51) Int. Cl.
  *G06F 17/00* (2006.01)
(52) U.S. Cl. .................. 707/102; 707/101; 706/59
(58) Field of Classification Search .............. 709/1–10, 709/100–103; 706/45–62; 707/1–10, 100–104.1
  See application file for complete search history.

(56) References Cited

U.S. PATENT DOCUMENTS

| | | | |
|---|---|---|---|
| 6,173,310 B1 * | 1/2001 | Yost et al. .................. 709/201 |
| 6,182,067 B1 * | 1/2001 | Presnell et al. ................. 707/5 |
| 6,230,066 B1 * | 5/2001 | Sferro et al. ................ 700/104 |
| 6,236,994 B1 * | 5/2001 | Swartz et al. .................. 707/6 |
| 6,484,155 B1 * | 11/2002 | Kiss et al. .................... 706/46 |
| 6,499,024 B1 * | 12/2002 | Stier et al. .................... 706/50 |
| 6,513,027 B1 * | 1/2003 | Powers et al. ................ 706/47 |
| 6,560,589 B1 * | 5/2003 | Stier et al. .................... 706/50 |
| 6,591,258 B1 * | 7/2003 | Stier et al. .................... 706/50 |
| 6,629,096 B1 * | 9/2003 | Reddy .......................... 707/5 |
| 6,678,694 B1 * | 1/2004 | Zimmermann et al. ...... 707/102 |
| 6,952,688 B1 * | 10/2005 | Goldman et al. ............. 706/47 |

* cited by examiner

*Primary Examiner*—Joon Hwan Hwang
(74) *Attorney, Agent, or Firm*—Blakely, Sokoloff, Taylor & Zafman LLP; Thierry K. Lo

(57) ABSTRACT

In a method of managing knowledge, existing knowledge is captured in a predetermined format of selected information categories, the captured knowledge is organized into an indexed database of information including links between related information, new knowledge is acquired and captured in the predetermined format, and the database is updated to include the new information and links between the new information and related information.

13 Claims, 1 Drawing Sheet

KNOWLEDGE MANAGEMENT SYSTEM AND METHOD

RELATED APPLICATIONS

This patent application claims the priority of provisional patent applications Ser. No. 60/252,207 and Ser. No. 60/252,261, both filed on Nov. 20, 2000.

BACKGROUND OF THE INVENTION

Many disciplines, such as engineering and medicine, have accumulated a vast repository of knowledge that needs to be preserved and passed through time to be expanded and improved upon by each successive generation. Oftentimes, this knowledge does not exist in a tangible form outside of the minds of those who develop and apply it. The process of preserving and passing on this knowledge involves a complex and costly combination of formal education, mentoring, and on-the-job training. Although those involved in academia are trained to record their advances in great detail, more often than not such advances come from the 'field' and those involved in the day-to-day application of science. However, engineers, doctors and other such hands-on professionals are usually too busy or distracted to keep complete, up-to-date records. Therefore, what is needed is a method and/or a system to allow an organization to capture the knowledge of its members or employees, and manage that knowledge to allow the entire organization to use it and to further contribute to it.

BRIEF SUMMARY OF THE INVENTION

In one aspect, the invention provides a method of managing knowledge comprising capturing existing knowledge in a predetermined format of selected information categories, organizing the captured knowledge into an indexed database of information including links between related information, acquiring new knowledge, capturing the new knowledge in the predetermined format, and updating the database to include the new information and links between the new information and related information.

In a further aspect, the present invention provides a knowledge management system comprising an indexed database of captured knowledge comprising information organized in selected information categories and links between related information, and a process executable on a computer to capture new knowledge in the selected information categories and to update the database to include the new information and links between the new information and related information.

DETAILED DESCRIPTION OF THE INVENTION

Figure 1:
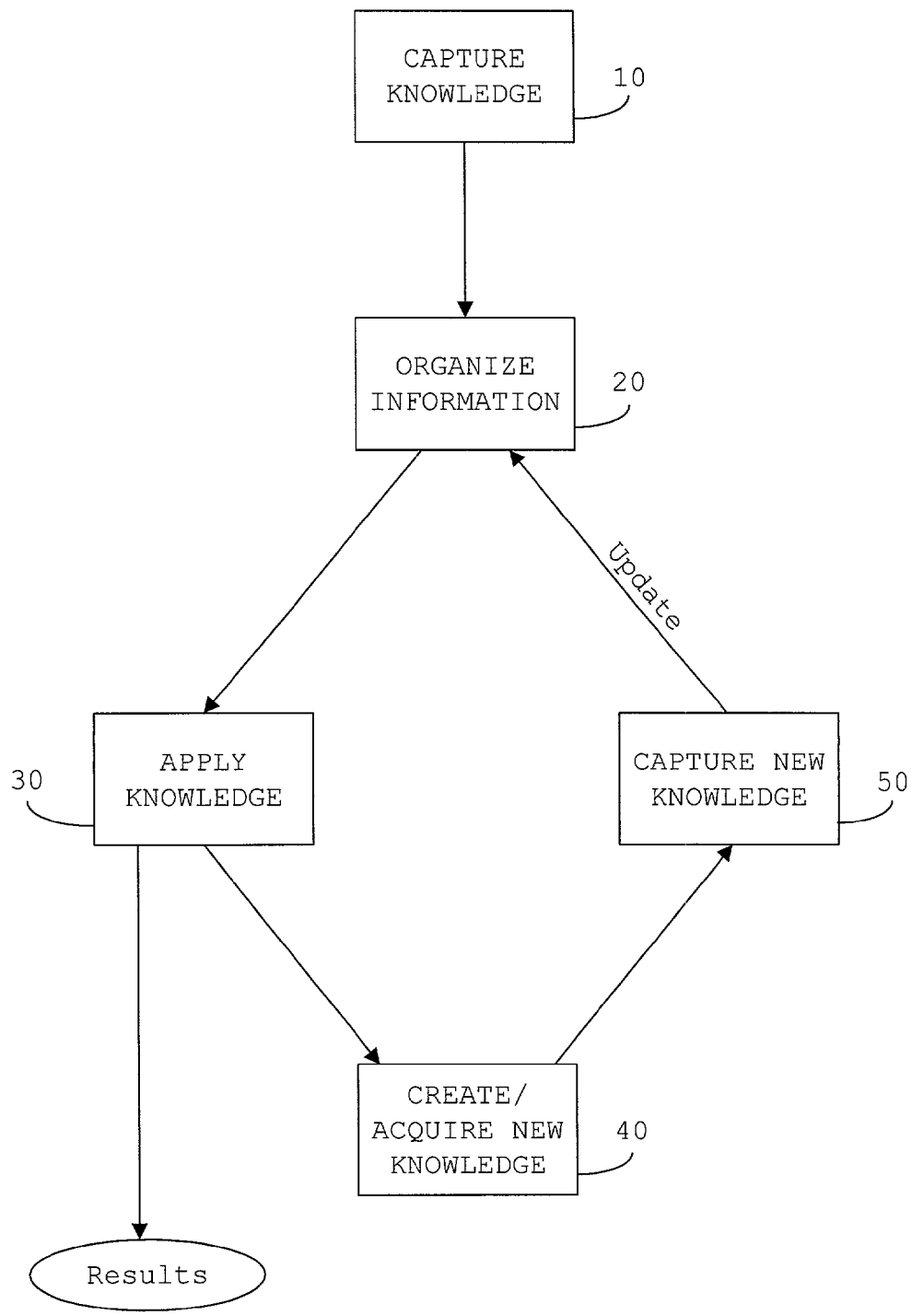
FIG. 1 is a diagram of a knowledge management methodology according to the invention.

Referring to FIG. 1, initial process or step 10 entails capturing the existing knowledge in an organization, as typically comprised of the employees' experience and education and tangible materials such as laboratory notebooks, project logs, manuals, etc. The capture process 10 may include any combination of employee interviews and tangible materials reviews required to sufficiently extract the knowledge initially existent in the organization. The interviews and/or reviews may be conducted by an outside entity whose sole function is to capture this knowledge and that, by relying on unbiased 'outsiders' will not be prone to omissions and oversights as employees who are thoroughly familiar with the organization, its business model and its products and/or services may be. Within the example of a manufacturing company, capture step or process 10 may include interviews with managers to find out what products the company produces, the organizational flow and tracking/reporting requirements of the company, and relevant financial information such as highest cost items, largest cost impact variables, number and type of suppliers; interviews with engineers to memorialize established design methods and processes, obtain copies of design manuals, references, lab notebooks, etc.; and interviews with production personnel (including personal interviews, team interviews, focus groups, surveys, and observation by data gathering personnel) to identify and capture any special knowledge and insights related to manufacturing variables such as particular materials, machines, or processes that have been gleaned over time on the shop floor.

Following knowledge capture 10, the existing knowledge base is organized 20 in a form and format that offers maximum flexibility in accessing the knowledge throughout the organization and allows expansion and enhancement of the knowledge base in a controlled, supervised, and quality-assured manner. A highly flexible and cost-effective form is electronic, wherein the knowledge base is input into an electronic, computerized database as text and graphics. Appendix A contains a description of an embodiment of a software system incorporating aspects of the invention. Appendix B further discloses one embodiment of a method for deploying a software system incorporating aspects of the invention.

In one approach to organizing the captured knowledge, the initial step entails identifying the most critical processes/information that are used on a daily or weekly basis, or that organization members specifically identify as most critical to their work. Other guidelines for organizing the captured knowledge may include identifying any of the following:

- information that must be captured or tracked for business or management reasons;
- information that is unavailable when needed the most, such as by creating a high risk situation if it cannot be accessed when needed due to a key person being inaccessible;
- information that is used often but that must frequently be reinvented;
- information that should be standardized for ISO, FDA or other reasons;
- processes that would run more efficiently if integrated with other available tools;
- information that will have an appeal for engineers due to their level of sophistication;
- information that will help train users to learn the software;
- information that would normally only be available to a company expert;
- information that is often used to train new employees;
- information that is observed as weak points in the collective knowledge of the company;
- information that will empower users to make better, more informed decisions;
- information that will stimulate the creativity of the users;
- information that is typically shared amongst many users and would be more useful if made available to multiple users simultaneously;

information that is important for a group to be aware of, rather than just one individual;

information that will be lost due to turnover and retirement; and information that will help align operations with company strategy.

With continued reference to the exemplar of a manufacturing company, the knowledge is likely to center around the design and manufacture of certain types of products. Thus, the format selected for organizing and utilizing the information comprising the knowledge database may be grouped in a plurality of workflows, each defined by a sequence or sequences of steps, whether for design or manufacturing, wherein each step is linked to at least one other step in chronological, logical, and/or other type of relationship. The steps thus may incorporate and apply a wide variety of information. Each step may be defined in the same manner as all other steps, and may each be defined by a plurality of fields or categories of information. By way of example only, the steps in an engineering design workflow may each include:

a computational field containing an equation or algorithm for calculating or deriving a quantity or value required by the final design, or alternatively a logic decision point;

a variables field where the equation variables are defined and values assigned;

an annotation/comments field where various related information may be entered, such as observations related to the use of the particular equation in a certain application;

a references field listing preferred or required reference information and materials, or links thereto; and a suppliers field listing suppliers that may provide the particular materials and/or devices required in the workflow or in the particular step of the workflow;

The fields listed above are merely exemplary, and many more may be included depending upon the type of knowledge being captured and organized. Importantly, each field may be linked to any other relevant unit of knowledge in the database for quick and intuitive retrieval and assessment of related information. For example, the comments field may contain links to references that are relevant to the variables in the equation or other source material. Each of the variables may themselves be linked to references explaining their significance, or to independent software or workflows that would allow the use to select or calculate an appropriate value for the variable, including third-party commercial software and software/workflows developed in-house. The reference field may contain links to the specified references and perhaps to alternatives, including engineering manuals and texts, encyclopedias, etc. The knowledge is thus not merely captured and organized by the method of the invention, but is actively applied to problem solving.

In the manner described above, such a form-based approach may be used to capture a particular knowledge base into a logically organize, usable form. The forms may be provided with a degree of intelligence such that they adapt to the information being entered and automatically link the information being entered to related or relevant, previously entered information. In this manner, the capturing process may be enhanced such that as a particular employee builds a workflow by specifying each step through completing a form as described above, relevant information that may have been entered by another user is automatically linked. Upon automatically linking a certain quantum of information, the present user may be further prompted to divulge further information that she may otherwise have chosen, perhaps subconsciously, not to include in the respective form or workflow.

In allowing the complete capture of what is in essence a 'custom' knowledge base it may prove useful to provide for a custom taxonomy wherein the taxonomy of the particular organization may also be captured, defined, and cross-linked to other relevant quanta of information. As a simple example, a certain mechanical device may be used very frequently in a manufacturing company and may have been redesigned from the standard configuration to meet particular requirements. Identifying the redesigned device as opposed to the standard device as such in all appropriate instances may save valuable time and avert errors. A custom taxonomy may also allow easier, more intuitive searching of the knowledge database by employees of the organization, provide more accurate results, and foster higher confidence. All terms defined in the custom taxonomy may be automatically interlinked to all other instances of that same term, and optionally to other, related terms.

To improve the ability to search the captured knowledge database, it may be useful to present results in a hierarchical tree where equally relevant results occupy the same branch. Deciding the relevance of a particular quantum of information to a particular search request may be based upon any combination of one or more of direct user input (i.e. the user who input the quantum of information also indicates, perhaps through a field in the input form or wizard, the relevance of the quantum to other quanta or other types of information), taxonomy relevance, subject matter relevance, organizational relevance (e.g. quanta of information derived from the same work group within the organization may be deemed more relevant than information derived from other workgroups), and others. Thus, as an example, searching for a particular device may present the results in a decision-tree format wherein the first decision point presents the three (or any other number) broadest categories of mechanical design in which the device may be found, followed by a few successively more narrowly-defined branches from each category, leading down ultimately to all the workflows that may be used to design the particular device, and/or may incorporate the device into a larger system, and/or contain additional information or resources regarding the device, etc.

The information contained in the knowledge database may further also be indexed, a task that is aided by the initial categorization of all information in one or more of a finite number of standard or pre-selected information fields. Thus, as an example, all references are instantly recognized and indexed as such due to their presence in the 'references' field. Further, all information present in the same field in all workflows, or all workflows in a certain sub-category, may be interlinked, and a hierarchy may be assigned to, or otherwise derived for the links between each such reference (or any other quantum of information) and all other references it is linked to.

Once existing knowledge has been captured 10 and organized 20, the organization and specifically its members/employees may apply the knowledge to the tasks of the organization, such as design, production, management, planning, and analysis. Different members of the organization may be assigned different types of access to the various organized information comprising the knowledge database. A project leader, for example, may assign various workflows to each member of the project team and employ other workflows to track project progress and cost, generate reports for upper management, and identify real and potential problems and retrieve possible solutions. The end results of applying the knowledge to a task will be defined by the task itself, such as the specifications and methods for manufacturing a certain object, or an analysis of a problem such a financial analysis of a proposed investment, or a medical diagnosis and proposed treatment.

As members apply 30 the information contained in the knowledge database, new information may be obtained and new knowledge may be generated. For instance, an engineer designing a component using an existing workflow may enhance the workflow by updating material properties and corresponding computational procedures to include recently developed materials of construction that were not available at the time the workflow was originally captured in the database. Similarly, as a workflow is applied in successive projects, engineers may add annotations memorializing lessons learned from each project and solutions employed, doctors may add new side effects of medicine experienced by each successive patient treated, and production managers may add shop-floor experiences with different machinery such as typical problems, most effective maintenance schedule, and spare parts most useful to keep in stock. Of course, as new projects are performed, new workflows may also be defined.

All new knowledge that is generated or acquired is captured 50 in the same manner that the existing knowledge base was originally captured 10, through the same form-based applications that intake information through the same information fields. Thus, as an example, an engineer designing a new part may choose an existing workflow and add additional steps to it and/or modify existing steps, or may choose to newly develop the entire workflow. Regardless of the choice, the engineer will proceed to work with the same information fields, building each step of the workflow through the appropriate form. For each information field the engineer will have access to all relevant information already captured in the database, regardless of whether that information is found in the same, similar, or different information fields. To make the process more intuitive and helpful, different forms may be provided for creating and updating any one or multiple databases, which forms may be selected automatically in accordance with the type of information the user (e.g. engineer) inputs into the system. The engineer will not only save time but will be enabled to make better decisions by having full, instant, intuitive access to any and all related information, including annotations from other engineers describing similar problems and their approach and ultimate solutions to those problems.

By capturing new information in the same format as that in which the knowledge database is organized, the database can easily be updated by organizing 20 the newly captured information, indexing the new information, and integrating it into the database by linking it to other relevant information. The database is updated automatically, by organizing, indexing and linking, every time new information is input into the system, such as through a workflow. The organization may choose to include quality controls such as by assigning authority only to selected members to incorporate new information into the database, and such members will then have to review all new information before it can be captured and incorporated into the database. New information may be saved and accessed even if it is not accepted as part of the knowledge base. Appendix C discloses further such actions and features that may be implemented as part of a system embodying aspects of the invention, and Appendix D discloses methods of employing such a system.

Having now described the invention in accordance with the requirements of the patent statutes, those skilled in the art will understand how to make changes and modifications to the disclosed embodiments to meet their specific requirements or conditions. Such changes and modifications may be made without departing from the scope and spirit of the invention, as defined and limited solely by the following claims.

What is claimed is:

1. A computer-implemented method for managing knowledge data in a knowledge database, comprising:
    capturing and storing existing knowledge data in the knowledge database based on a predetermined format of selected information categories grouped in a plurality of workflows, wherein each of said workflows includes a sequence of steps, wherein each step is linked to at least one other step in chronological or logical manner, and each step is built through a user defined form of a plurality of different forms having information fields containing one or more links;
    abstracting the captured knowledge data using meta data;
    organizing the abstracted captured knowledge data into an index in the knowledge database having information including links between related knowledge data, the index structured according to the abstracted captured knowledge data;
    acquiring new knowledge data by using user-defined forms of said plurality of different forms;
    capturing and storing the new knowledge data in said predetermined format; and
    updating the knowledge database to include the new knowledge data and links between the new knowledge data and related knowledge data.

2. The computer-implemented method of claim 1, wherein said capturing the new knowledge data further comprises:
    identifying the most critical element of the new knowledge data.

3. The computer-implemented method of claim 1, further comprising:
    providing timely and relevant information to a selected user based on predefined and user-modifiable preferences.

4. The computer-implemented method of claim 1, wherein said existing knowledge data and said new knowledge data are presented in a hierarchical tree.

5. The computer-implemented method of claim 1, wherein said existing knowledge data and said new knowledge data include a plurality of human-based processes.

6. The computer-implemented method of claim 5, wherein said plurality of human-based processes include business and management processes.

7. The computer-implemented method of claim 5, wherein said plurality of human-based processes include engineering processes.

8. The computer-implemented method of claim 1, further comprising:
    remotely accessing said knowledge database via a network of computers.

9. The computer-implemented method of claim 1, further comprising:
    applying knowledge data to a task; and
    tracking progress on said task.

10. The computer-implemented method of claim 1, further comprising:
    annotating the new knowledge data.

11. The computer-implemented method of claim 1, further comprising:

setting up a plurality of criteria associated with the new knowledge data, said plurality of criteria modifying said links between the new knowledge data and related knowledge data based in said plurality of criteria.

12. The computer-implemented method of claim 1, wherein said knowledge database includes fields defined by the captured existing knowledge data and the new knowledge data.

13. A program storage device readable by a computer, tangibly embodying a program of instructions executable by a processor of the computer to perform a method for managing knowledge data in a knowledge database, the method including:

capturing and storing existing knowledge data in the knowledge database based on a predetermined format of selected information categories grouped in a plurality of workflows, wherein each of said workflows includes a sequence of steps, wherein each step is linked to at least one other step in chronological or logical manner, and each step is built through a user defined form of a plurality of different forms having information fields containing one or more links;

abstracting the captured knowledge data using meta data;

organizing the abstracted captured knowledge data into an index in the knowledge database having information including links between related knowledge data, the index structured according to the abstracted captured knowledge data;

acquiring new knowledge data by using user-defined forms of said plurality of different forms;

capturing and storing the new knowledge data in said predetermined format; and updating the knowledge database to include the new knowledge data and links between the new knowledge data and related knowledge data.

\* \* \* \* \*